United States Patent
Lee et al.

(10) Patent No.: US 8,694,823 B2
(45) Date of Patent: Apr. 8, 2014

(54) QUERYING AND REPAIRING DATA

(75) Inventors: Chesong Lee, Issaquah, WA (US); Thomas J. Miller, Yarrow Point, WA (US); Neal R. Christiansen, Bellevue, WA (US); Matthew S. Garson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 148 days.

(21) Appl. No.: 13/303,170

(22) Filed: Nov. 23, 2011

(65) Prior Publication Data

US 2013/0067270 A1     Mar. 14, 2013

Related U.S. Application Data

(60) Provisional application No. 61/533,497, filed on Sep. 12, 2011.

(51) Int. Cl.
*G06F 11/00* (2006.01)

(52) U.S. Cl.
USPC .............................. 714/6.1; 714/6.2

(58) Field of Classification Search
USPC ......................... 714/6.1, 6.2, 6.24
See application file for complete search history.

(56) References Cited

U.S. PATENT DOCUMENTS

| | | | |
|---|---|---|---|
| 6,728,922 B1 * | 4/2004 | Sundaram et al. | 714/769 |
| 6,970,890 B1 | 11/2005 | Bruce et al. | |
| 7,200,626 B1 | 4/2007 | Hoang et al. | |
| 7,490,268 B2 | 2/2009 | Keromytis et al. | |
| 7,526,622 B1 * | 4/2009 | Bonwick et al. | 711/162 |
| 7,877,635 B2 | 1/2011 | Palazzolo et al. | |
| 7,904,756 B2 | 3/2011 | Dilman et al. | |
| 7,913,114 B2 * | 3/2011 | Leppard | 714/15 |
| 8,417,987 B1 * | 4/2013 | Goel et al. | 714/6.1 |
| 8,464,096 B2 * | 6/2013 | Thornton et al. | 714/6.24 |
| 2007/0106925 A1 | 5/2007 | Moore et al. | |
| 2007/0162523 A1 | 7/2007 | Lin | |
| 2009/0055682 A1 | 2/2009 | Gibson et al. | |

OTHER PUBLICATIONS

"International Search Report", Mailed Date: Sep. 26, 2012, Application No. PCT/US2011/055827, Filed Date: Oct. 11, 2011, pp. 10.
"Recovering Oracle", Retrieved at <<http://www.oreilly.co.jp/BOOK/unixback/download/oracle.html>>, Retrieved Date: Sep. 9, 2011, pp. 29.

* cited by examiner

*Primary Examiner* — Yolanda L Wilson
(74) *Attorney, Agent, or Firm* — John Jardine; Andrew Sanders; Micky Minhas (57) ABSTRACT

Aspects of the subject matter described herein relate to querying and repairing data. In aspects, a component may detect that data on storage has become corrupted. In response, the component may request data from one or more redundant copies of the data and may determine which of the redundant copies, if any, are not corrupted. If a non-corrupted copy is found, the component may send a request that the corrupted data be repaired and may identify the non-corrupted copy to use to repair the corrupted data.

20 Claims, 8 Drawing Sheets

QUERYING AND REPAIRING DATA

CROSS REFERENCE TO RELATED APPLICATION

This application claims the benefit of U.S. Provisional Application No. 61/533,497, filed Sep. 12, 2011, entitled QUERYING AND REPAIRING DATA, which application is incorporated herein in its entirety.

BACKGROUND

Data on various electronic storage media may become corrupted over time. With some types of media such as CDs, DVDs, magnetic tapes, floppy disks and others, the media actually starts to decay and consequently loses data. With other types of media such as EPROMs and flash memory, electrical charges may dissipate leading to lost data. Although it is generally known that hard drives and even solid state devices (SSDs) may lose data when they crash or otherwise become inoperative, what is not well known, at least by some outside of the industry, is that even well-functioning storage devices that have not crashed may have data that becomes silently or otherwise corrupted.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to querying and repairing data. In aspects, a component may detect that data on storage has become corrupted. In response, the component may request data from one or more redundant copies of the data and may determine which of the redundant copies, if any, are not corrupted. If a non-corrupted copy is found, the component may send a request that the corrupted data be repaired and may identify the non-corrupted copy to use to repair the corrupted data.

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment."

As used herein, terms such as "a," "an," and "the" are inclusive of one or more of the indicated item or action. In particular, in the claims a reference to an item generally means at least one such item is present and a reference to an action means at least one instance of the action is performed.

Sometimes herein the terms "first", "second", "third" and so forth may be used. Without additional context, the use of these terms in the claims is not intended to imply an ordering but is rather used for identification purposes. For example, the phrase "first version" and "second version" does not necessarily mean that the first version is the very first version or was created before the second version or even that the first version is requested or operated on before the second versions. Rather, these phrases are used to identify different versions.

Headings are for convenience only; information on a given topic may be found outside the section whose heading indicates that topic.

Other definitions, explicit and implicit, may be included below.

Exemplary Operating Environment

Figure 1:
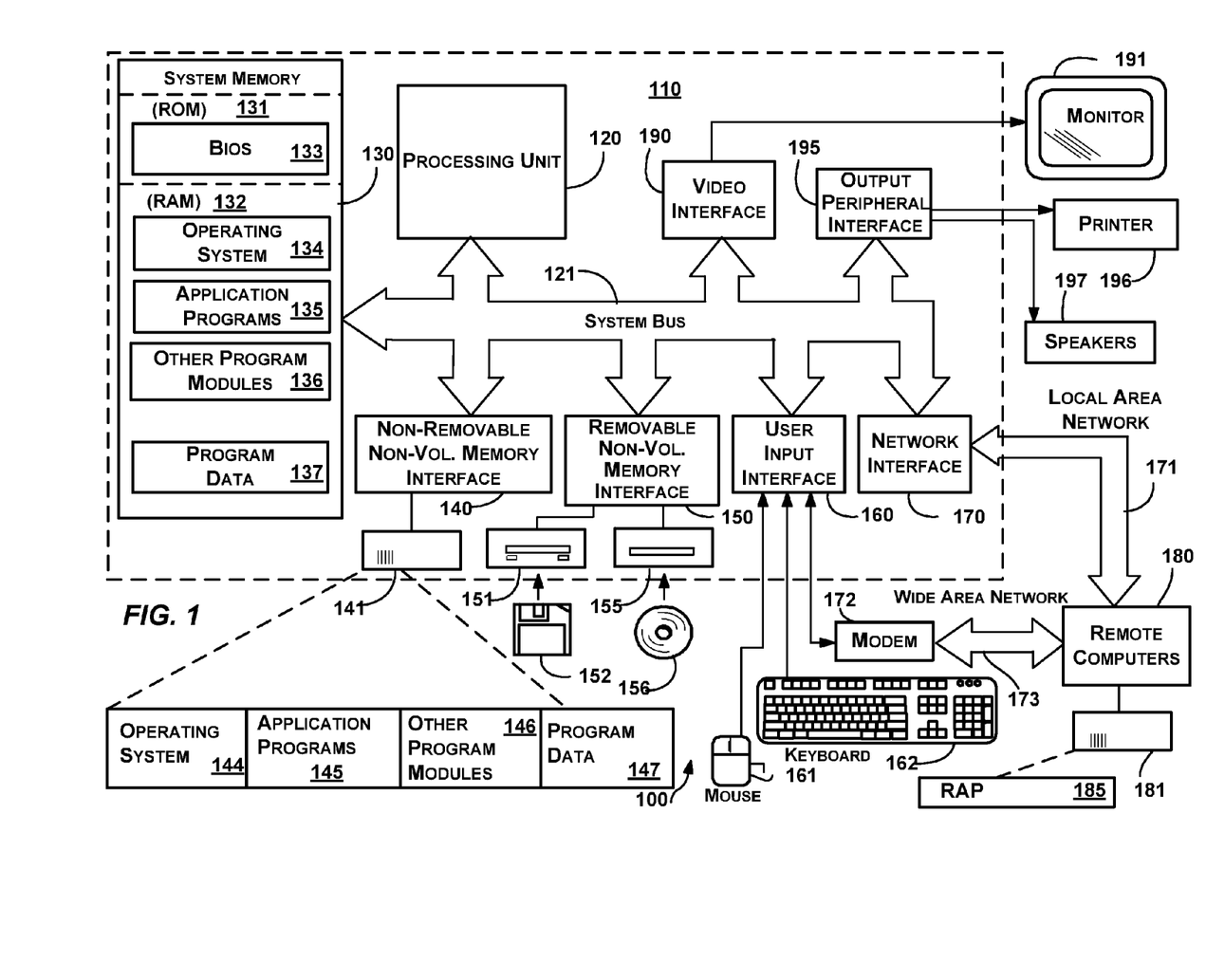
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well-known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and non-volatile, removable and non-removable media implemented in any method or technology for storage of information such as computer-readable instructions, data structures, program modules, or other data. Computer storage media includes RAM, ROM, EEPROM, solid state storage, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards, digital versatile discs, other optical discs, digital video tape, solid state RAM, solid state ROM, and the like. The hard disk drive 141 may be connected to the system bus 121 through the interface 140, and magnetic disk drive 151 and optical disc drive 155 may be connected to the system bus 121 by an interface for removable non-volatile memory such as the interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone, joystick, game pad, satellite dish, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Repairing Data

Figure 2:
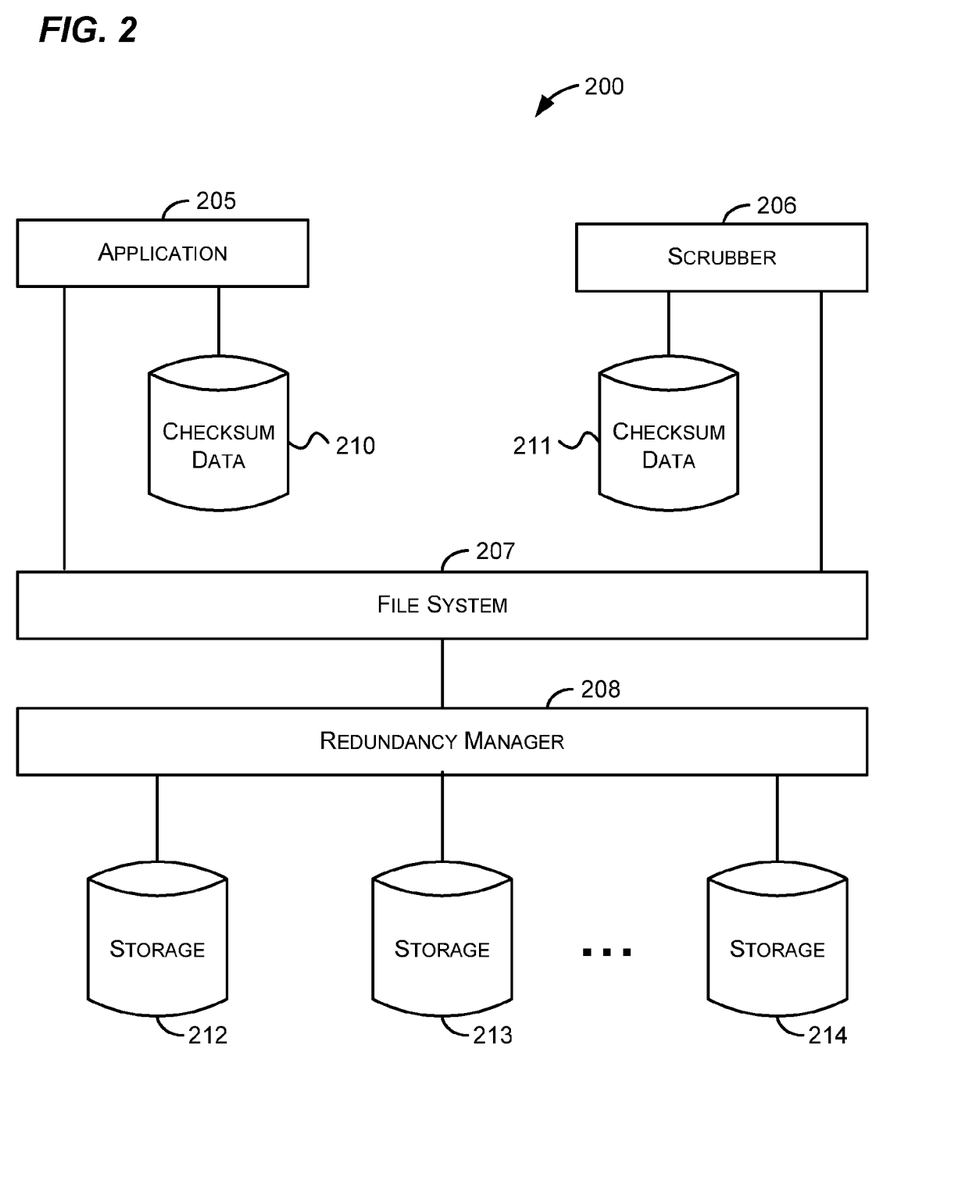
FIG. 2 is a block diagram that represents an exemplary environment in which aspects of the subject matter may be incorporated.

As mentioned previously, data on storage media may become corrupted. FIG. 2 is a block diagram that represents an exemplary environment in which aspects of the subject matter may be incorporated. The environment 200 includes entities 205-208 and 210-214. A single one of these entities is sometimes referred to as a component while two or more of these entities are sometimes referred as components.

The components illustrated in FIG. 2 are exemplary and are not meant to be all-inclusive of components that may be needed or included. Furthermore, the number of storage components may differ in other embodiments without departing from the spirit or scope of aspects of the subject matter described herein. In some embodiments, the components described in conjunction with FIG. 2 may be included in other components (shown or not shown) or placed in subcomponents without departing from the spirit or scope of aspects of the subject matter described herein. In some embodiments, the components and/or functions described in conjunction with FIG. 2 may be distributed across multiple devices.

As used herein, the term component is to be read to include hardware such as all or a portion of a device, a collection of one or more software modules or portions thereof, some combination of one or more software modules or portions thereof and one or more devices or portions thereof, and the like.

For example, the components illustrated in FIG. 2 may be implemented using one or more computing devices. Such devices may include, for example, personal computers, server computers, hand-held or laptop devices, multiprocessor systems, microcontroller-based systems, set-top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like.

An exemplary device that may be configured to implement one or more of the components of FIG. 2 comprises the computer 110 of FIG. 1.

A component may also include or be represented by code. Code includes instructions that indicate actions a computer is to take. Code may also include information other than actions the computer is to take such as data, resources, variables, definitions, relationships, associations, and the like.

Code may be executed by a computer. When code is executed by a computer, this may be called a process. The term "process" and its variants as used herein may include one or more traditional processes, threads, components, libraries, objects that perform tasks, and the like. A process may be implemented in hardware, software, or a combination of hardware and software. In an embodiment, a process is any mechanism, however called, capable of or used in performing an action. A process may be distributed over multiple devices or a single device. An application (e.g., the application 205 and the scrubber 206) may execute in user mode, kernel mode, some other mode, a combination of the above, or the like. The application may execute as part of the storage system or outside (i.e. not as part) of the storage system.

The stores 210-214 may include any storage media capable of storing data. A store may include volatile memory (e.g., RAM or other volatile memory described previously) and/or non-volatile memory (e.g., hard drives or other non-volatile memory described previously). A store may be located entirely on one device or may be distributed across multiple devices. A store may be external, internal, or include components that are both internal and external to a storage system hosting the store.

The term data is to be read broadly to include anything that may be represented by one or more computer storage elements. Logically, data may be represented as a series of 1's and 0's in volatile or non-volatile memory. In computers that have a non-binary storage medium, data may be represented according to the capabilities of the storage medium. Data may be organized into different types of data structures including simple data types such as numbers, letters, and the like, hierarchical, linked, or other related data types, data structures that include multiple other data structures or simple data types, and the like. Some examples of data include information, program code, program state, program data, other data, and the like.

Figure 8:
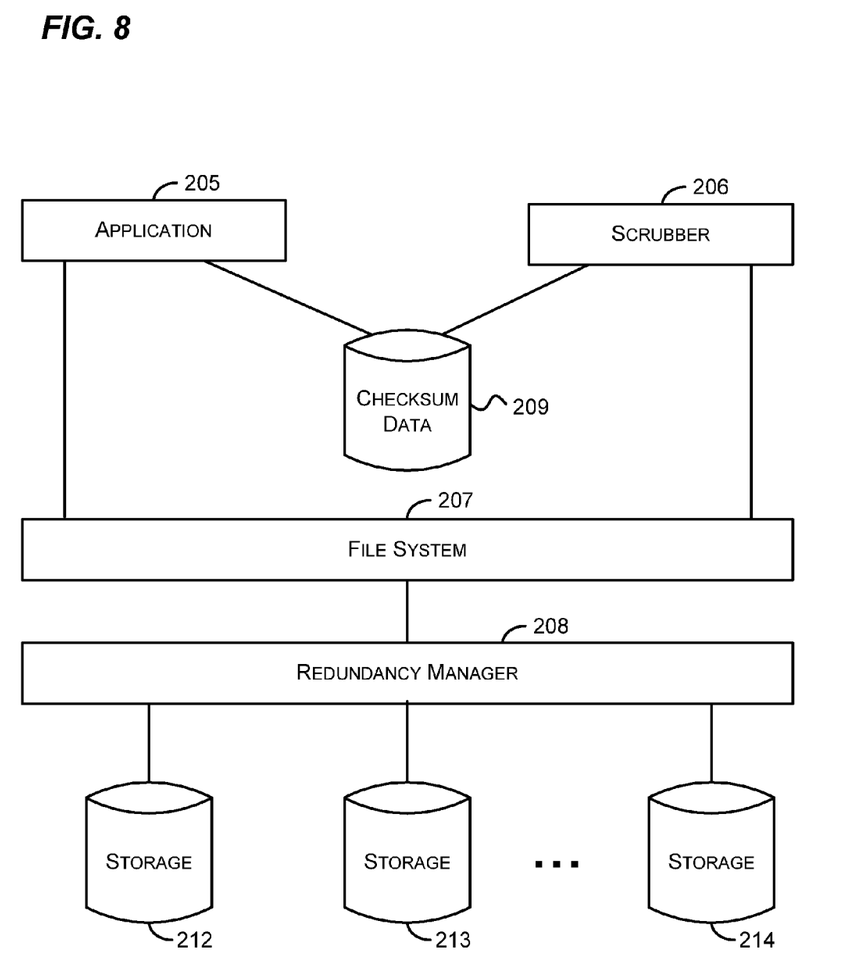
FIG. 8 is a block diagram that represents another exemplary environment in which stores of FIG. 2 have been combined in accordance with aspects of the subject matter described herein.

Although the stores 210 and 211 are illustrated as connected to the application 205 and the scrubber 206, respectively, in other embodiments, these stores may be accessible to the application 205 and the scrubber 206 via the file system 207. In some implementations, the store 210 and the store 211 may be combined such that both the application 205 and the scrubber 206 use the same store in obtaining checksums. An example of this is illustrated in FIG. 8 in which the stores 210 and 211 of FIG. 2 have been combined into the store 209.

Returning to FIG. 2, in some implementations, the stores 210 and 211 may be hosted on a storage system that hosts the stores 212-214. In other implementations, the stores 210 and 211 may potentially be hosted on a storage system separate from the storage system that hosts the stores 212-214. The number of stores illustrated in FIG. 2 is exemplary only. In other embodiments, there may be more or fewer stores.

The application 205 may communicate with the file system 207 to access data on the stores 212-214. Access as used herein may include reading data, writing data, deleting data, updating data, a combination including two or more of the above, and the like.

The file system 207 may be responsible for persisting data to and retrieving data from non-volatile storage (e.g., the stores 212-214) via the redundancy manger 208. When the file system 207 receives a read request, the file system 207 may communicate with the redundancy manager 208 to obtain the requested data from one or more of the stores 212-214. After the redundancy manager 208 has provided the data to the file system 207, the file system 207 may provide the data to the requesting entity (e.g., the application 205 or the scrubber 206).

The redundancy manager 208 may be responsible for storing one or more copies of data on the stores 212-214. For example, the redundancy manager 208 may mirror data of one store onto one or more other stores. As another example, the redundancy manager 208 may store multiple logical copies of the data by using standard or proprietary Redundant Array of Independent Disks (RAID) techniques known to those skilled in the art. The term "logical" is used to indicate that data (e.g., parity or other data) less than a complete physical copy may be stored on the other stores in a way that a complete copy can be created from this data if a physical copy becomes corrupted.

The file system 207 and/or the redundancy manager 208 may detect and correct some errors in the data from the stores 212-214 prior to providing the data to the application 205 or the scrubber 206. For example, the file system 207 or the redundancy manager 208 may also store other checksum data that may be used to detect and correct some types of data errors on the stores 212-214. Checksums are described in more detail below. If the file system 207 and/or the redundancy manager 208 detect an error that can be corrected by stored checksum data, the error may be corrected without informing the application 205 or the scrubber 206.

In some implementations, the redundancy manager 208 may be implemented as a component of the file system 207. In other implementations, the redundancy manager 208 may be implemented as one or more components separate from the file system 207. The file system 207, the redundancy manager 208, and any storage devices used by the file system 207 and the redundancy manager 208 are sometimes referred to herein as a storage system. A storage system may include any components needed to persist and provide access to data.

In conjunction with obtaining data from the file system 207, the application 205 may obtain a corresponding checksum from the store 210 to determine if the data has been corrupted. In one implementation, the application 205 may be configured to attempt to validate data returned in response to each read request issued by the application 205 to the storage system. In another implementation, the application 205 may be configured to attempt to validate data returned in response to some read requests issued by the application 205 to the storage system. For example, the application may be configured to validate some read data (e.g., for certain files), while not validating other data (e.g., for other files).

As used herein, the term checksum includes any type of data that may be used to validate other data. Validating other data means that a checksum may be used to verify that data has not become corrupted. A checksum may be simple or complex and may include information to detect different types of errors.

For example, a checksum such as a parity bit may be used to detect parity errors, while a more sophisticated checksum such as a cyclic redundancy check (CRC) may be used to detect error bursts of several bits. Some other checksums such as message authentication code (MAC), cryptographic hash functions, or some other function may be used to detect other data corruptions that may occur to data.

A checksum may be used in error detection or in error detection and correction. For example, a checksum may include data to detect errors but not to correct the errors. As another example, a checksum may include data to detect and correct certain types of errors. A checksum that includes data to correct certain types of errors may be known as an error-correcting code (ECC).

The examples above are not intended to be all-inclusive or exhaustive of the types of checksums that may be used by aspects of the subject matter described herein. Indeed, based on the teachings herein, those skilled in the art may recognize other checksums that may be used without departing from the spirit or scope of aspects of the subject matter described herein.

If the application 205 determines via the checksum that the data from the file system 207 is corrupted, the application 205 may attempt to obtain non-corrupted data from a redundant copy of the data. As a first step, the application 205 may ask the file system 207 to provide each copy of the data that is stored on the stores 212-214. If the data is only stored once on the stores 212-214, the application 205 may attempt to correct the data with the checksum (if possible) or may indicate a non-recoverable data corruption error (e.g., via a log, user interface, or the like).

If one or more copies of the data are stored on the stores 212-214, the application 205 may request the data of each copy and may use the checksum to determine if any of the copies contain non-corrupted data. In response, the redundancy manager 208, may provide each copy as requested to the file system 207 which may provide each copy to the application 205.

If a copy contains non-corrupted data, the application 205 may indicate that the copy is to be used to correct the corrupted original data. If a copy contains non-corrupted data and one or more other copies contain corrupted data, the application 205 may also indicate that the copy containing the non-corrupted data be used to correct the one or more copies with corrupted data. In one embodiment, when the original data is corrupted, the application 205 may request copies of the data only until it finds a copy that has non-corrupted data. In another embodiment, the application 205 may request all copies of the data to identify all copies of the data that are also corrupted.

The chunk of data corresponding to a checksum may vary in different implementations. For example, in one embodiment, the size of a chunk of data corresponding to a checksum may be 4 kilobytes. In another embodiment, the size of a chunk of data corresponding to a checksum may be 64 kilobytes. In yet another embodiment, the size of a chunk of data corresponding to a checksum may be the size of the file. The above sizes of data are exemplary only. In other embodiments, the size of chunk of data corresponding to a checksum may be smaller or larger than the sizes indicated above.

The scrubber 206 may execute at configurable times (e.g., periodic, scheduled times, or the like) to detect and correct data corruption of data stored on the stores 212-214. Instead of detecting and correcting data corruption of data it may be currently using (e.g., like the application 205), the scrubber 206 may scan one or more volumes, files, or portions thereof, blocks of data, or the like to detect and correct data corruption. In one embodiment, the scrubber 206 may execute as a low priority process to attempt to preserve performance. In another embodiment, the scrubber 206 may execute at a priority other than low priority.

The environment 200 may include one or more other scrubbers (not shown) in addition to the scrubber 206. In such an implementation, the scrubber 206 may tag files (e.g., using a file property, attribute, or other metadata associated with the files) that the scrubber 206 wants the other scrubber(s) to skip during its scrubbing activities. The scrubber 206 may do this, in part, to ensure that only the scrubber 206 attempts to correct the corrupted data of such files.

In addition, there may be some coordination between the application 205, the scrubber 206, and the other scrubber(s) (if any) so that they do not attempt to scrub the same data at the same time.

In one embodiment, the application 205 (and also the scrubber 206) may also synchronize error detection and correction activities with other processes. For example, other processes may be writing to the data that the application 205 is accessing. Before the application 205 sends an instruction to correct a block of data to the file system 207, the application 205 may verify that the block has not been changed since the block was read by the application 205. If the block has changed, the application 205 may again read and validate the block to see if the contents are still corrupted.

In another embodiment, the file system 207 and/or the redundancy manager 208 may synchronize activities that affect a block of data that is stored on one or more of the stores 212-214. For example, if the application 205 determines that a block of data is corrupted and needs to be replaced with a copy of the data, a write affecting the same block of data may be received by the file system 207 before the application 205 sends a change to correct the data. The write may overwrite the corrupted data and thus "correct" the data. If this occurs, the file system 207 may ignore the later indication that the block of data is corrupted and needs to be replaced.

As another example, if the file system 207 receives an I/O that indicates a change that affects a corrupted block after the file system 207 receives an indication that the block needs to be corrected, the I/O indicating the change may be held by the file system 207 until the data correction activities have been performed.

The synchronization activities indicated above are exemplary only and are not intended to be all-inclusive or exhaustive. Based on the teachings herein, those skilled in the art may recognize other synchronizing activities that may be performed by the file system 207 and/or the redundancy manager 208 without departing from the spirit or scope of aspects of the subject matter described herein.

FIGS. 3-6 are flow diagrams that generally represent exemplary actions that may occur in accordance with aspects of the subject matter described herein. For simplicity of explanation, the methodology described in conjunction with FIGS. 3-6 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Figure 3:
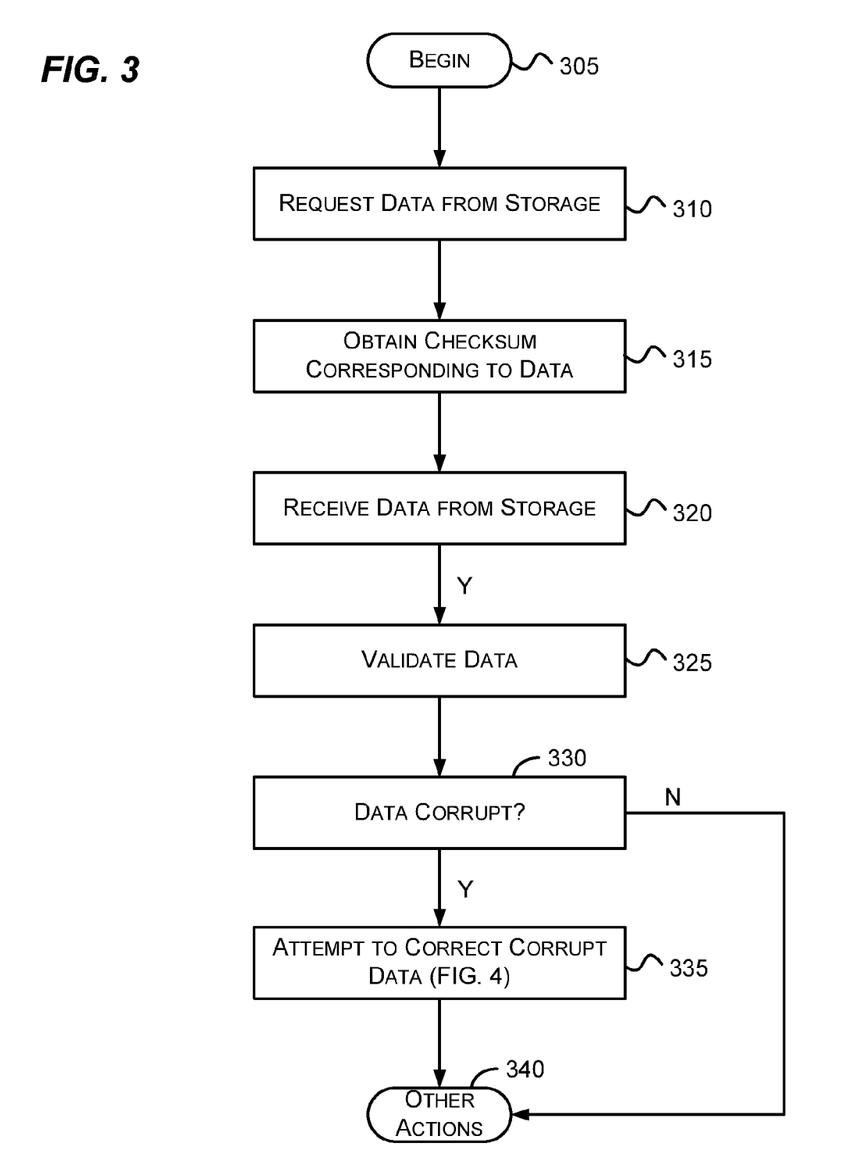
FIGS. 3-4 are block diagrams that generally represent exemplary actions that may occur from the perspective of an application in accordance with aspects of the subject matter described herein.
Figure 4:
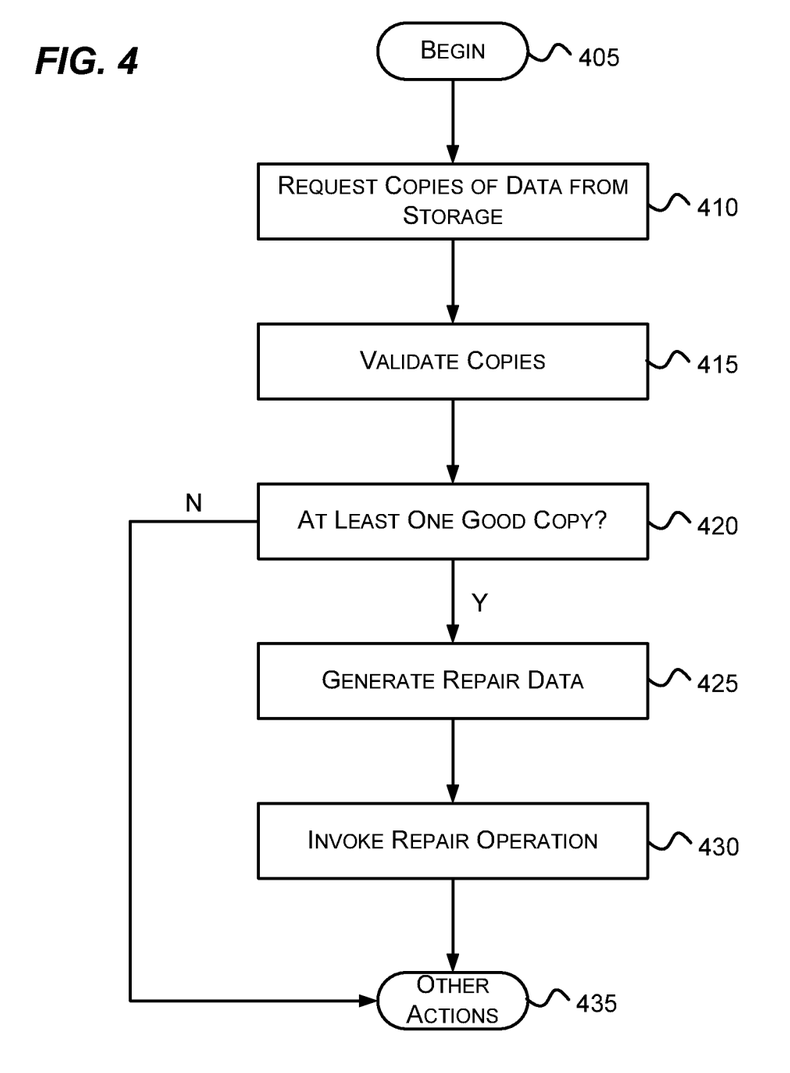

FIGS. 3-4 are block diagrams that generally represent exemplary actions that may occur from the perspective of an application in accordance with aspects of the subject matter described herein. Turning to FIG. 3, at block 305, the actions begin.

At block 310, data is requested from storage. For example, referring to FIG. 2, the application 205 may request stored data by sending an I/O request to the file system 207.

At block 315, checksum data corresponding to the requested data is obtained. For example, referring to FIG. 2, the application 205 may obtain a checksum that corresponds to the data requested at block 310 from the store 210. The actions associated with blocks 205 and 210 may proceed in parallel if desired.

At block 320, data is received from the storage. For example, referring to FIG. 2, the application 205 receives the data from the file system 207 (which obtained that data form the redundancy manager 208, which obtained the data from one or more of the stores 212-214.).

At block 325, the data is validated. For example, referring to FIG. 2, the application uses the checksum to validate the data requested from the file system 207. This validation may involve, for example, computing a checksum of the data requested from the file system 207 and comparing this checksum with the checksum obtained from the store 210.

At block 330, if the data is corrupt (e.g., the checksums do not match), the actions continue at block 335; otherwise, the actions continue at block 340.

At block 335, an attempt is made to correct the corrupt data as described in more detail in conjunction with FIG. 4.

At block 340, other actions, if any, may be performed.

Turning to FIG. 4, at block 410, copies of the data, if any, are requested from the storage. For example, referring to FIG. 2, the application 205 requests one or more copies of the data from the file system 207.

Sometimes the terms "file handle" or "handle" are used herein. Each of these terms is to be understood to mean any indicator that may be used for accessing a file. For example, a file handle may include an integer, pointer, data that references a data structure that provides context about a file, or other data that may be used to access a file, or the like. For example, a file handle may be returned by a file system to a process when the file system opens a file for the process and may be provided by the process to the file system when the process requests an operation to be performed on the file.

In one embodiment, the application 205 may request a specific copy by indicating to the file system 207 that subsequent operations for a file handle are to be satisfied by the copy indicated. In response, the file system 207 may set a property of the handle to indicate the specific copy for subsequent operations. Thereafter, until instructed otherwise by the application 205, whenever the file system receives a request associated with the handle, the file system 207 may specify the specific copy from which the request is to be satisfied when communicating with the redundancy manager 208. After the application 205 is finished with requesting specific copies of the data, the application may indicate that any copy may be used to satisfy requests associated with the handle. In response, the file system 207 may, for example, set the property of the handle to indicate this for subsequent operations.

Using the above mechanism, the scrubber 206 may open a handle for each copy of the file that is stored in the stores 212-214. The scrubber may indicate that each handle is associated with a particular copy and may then use each handle to access a different copy of the data.

In another embodiment, an identifier indicating the specified copy may be passed with each I/O request to the file system 207.

In another embodiment, the application 205 may call a different read method of the file system 207 when accessing a specific copy of data. The different read method may allow the application 205 to indicate a specific copy from which the data is to be read.

After receiving a request for a specific copy of data, the file system 207 forwards the request or a request derived from the request to the redundancy manager 208 which obtains the data of the one or more copies and returns it to the file system 207. The file system in turn returns the data to the application. An application programming interface (API) may be exposed by the file system 207 and redundancy manager 208 that allows programs to query for the number of copies of the data and to indicate what copy is to be used to provide data to the program. The application 205 may use this interface to request copies by identifier (e.g., number or other identifier). The application 205 may request copies of the data in parallel or sequentially as desired.

In one embodiment, requesting copies stops after the first valid copy is found. In another embodiment, all copies of the data are requested and validated to correct any other copies that may be corrupted.

At block 415, validation is performed for the copies requested at block 410. For example, referring to FIG. 2, if there are two copies stored on the stores 212-214, the application 205 may request each of the two copies and may validate them using the checksum previously obtained from the store 210. The application 205 may populate a list, array, or other data structure to track which copies contain corrupted data and which contain non-corrupted data. If at least one of the copies contains non-corrupted data, this copy may be used to repair the original data and any other copies that include corrupted data.

At block 420, if at least one good copy is found, the actions continue at block 425; otherwise, the actions may continue at block 435.

At block 425, repair data is generated. For example, referring to FIG. 2, the application 205 may generate repair data to send to the file system 207 via an API. The repair data may identify a non-corrupted copy of the data, an indication that the original data needs to be corrected from a redundant copy, and an indication of what other copies, if any, need to be corrected from the good copy. If the original data and the other copies are all treated as just copies of the data, the repair data may identify a non-corrupted copy of the data and an indication of one or more other copies that need to be corrected from the non-corrupted copy.

At block 430, a repair operation is invoked. For example, the application 205 may send the repair data to the file system 207 which may send the repair data or repair data derived therefrom to the redundancy manager 208. Invoking the repair operation of the storage system instructs the storage system to repair corrupted data indicated by the repair data.

In an implementation, a repair operation may fail part way through the repair. For example, if the repair data indicates that a 64 kilobyte block is to be repaired from a good 64 kilobyte copy, an error may occur part way through the repair (e.g., at sector n of sector m of the 64 kilobyte block). In this case, the redundancy manager 208 may stop the repair as soon as the error has occurred and may provide data that indicates how far the repair proceeded until it failed. The application 205 may then decide what to do at that point in time. For example, the application 205 may attempt to retry the entire repair, retry the portion of the repair that failed, allocate other space on the file system and copy the file to the allocated space, abort the repair process, take other actions, or the like.

At block 435, other actions, if any, are performed.

Figure 5:
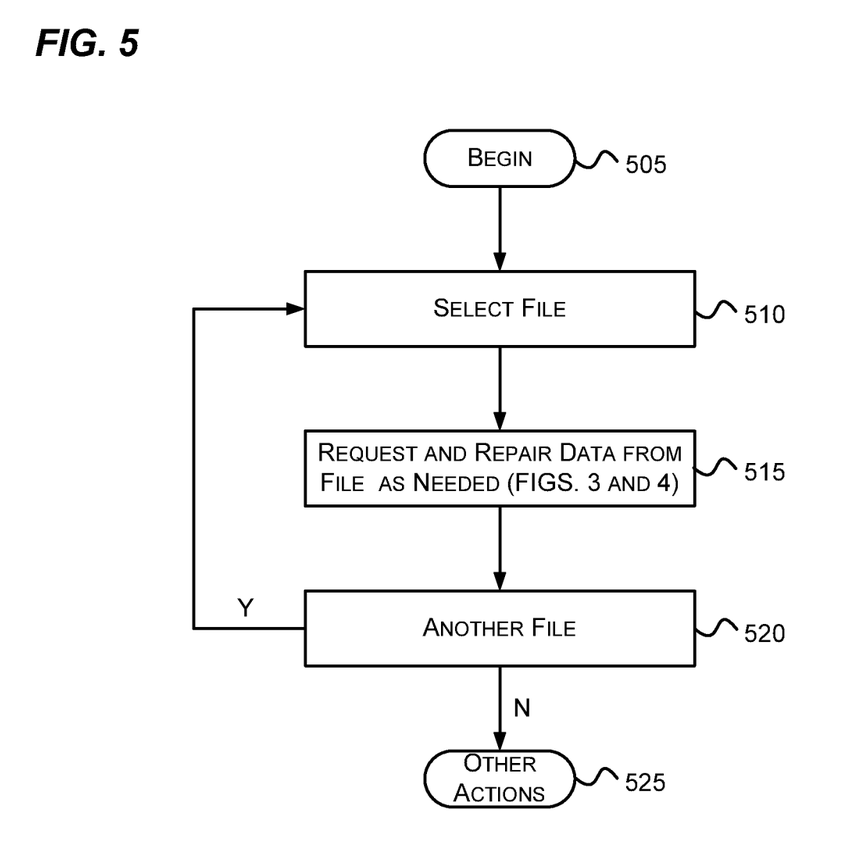
FIG. 5 is a block diagram that generally represents exemplary actions that may occur from the perspective of a scrubber in accordance with aspects of the subject matter described herein.

FIG. 5 is a block diagram that generally represents exemplary actions that may occur from the perspective of a scrubber in accordance with aspects of the subject matter described herein. The actions that are illustrated in FIG. 5 may occur at configurable or fixed times. For example, a scrubber may periodically validate a set of one or more volumes, files, or portions thereof, blocks of data, or the like and attempt to correct any corrupt data found therein.

Turning to FIG. 5, at block 505, the actions begin.

At block 510, a file is selected to scrub (e.g., look for data corruption in copies of data of the file). For example, referring to FIG. 2, the scrubber 206 may access a data structure (e.g., a list, collection, file system metadata, or the like) that indicates files that are to be scrubbed by the scrubber 206. The scrubber 206 may start with one of the files indicated by the data structure and work on the files indicated by the data structure until all of the files have been scrubbed.

At block 515, data blocks from the files are requested and repaired as needed. For example, after selecting a file, the scrubber 206 may begin requesting and repairing (as needed) data blocks from the file similarly to how the application requests data from the storage and repairs the data as needed as described in conjunction with FIGS. 3 and 4.

At block 520, if the scrubber has another file to scrub, the actions continue at block 510; otherwise, the actions continue at block 525.

At block 525, other actions, if any, may be performed.

Figure 6:
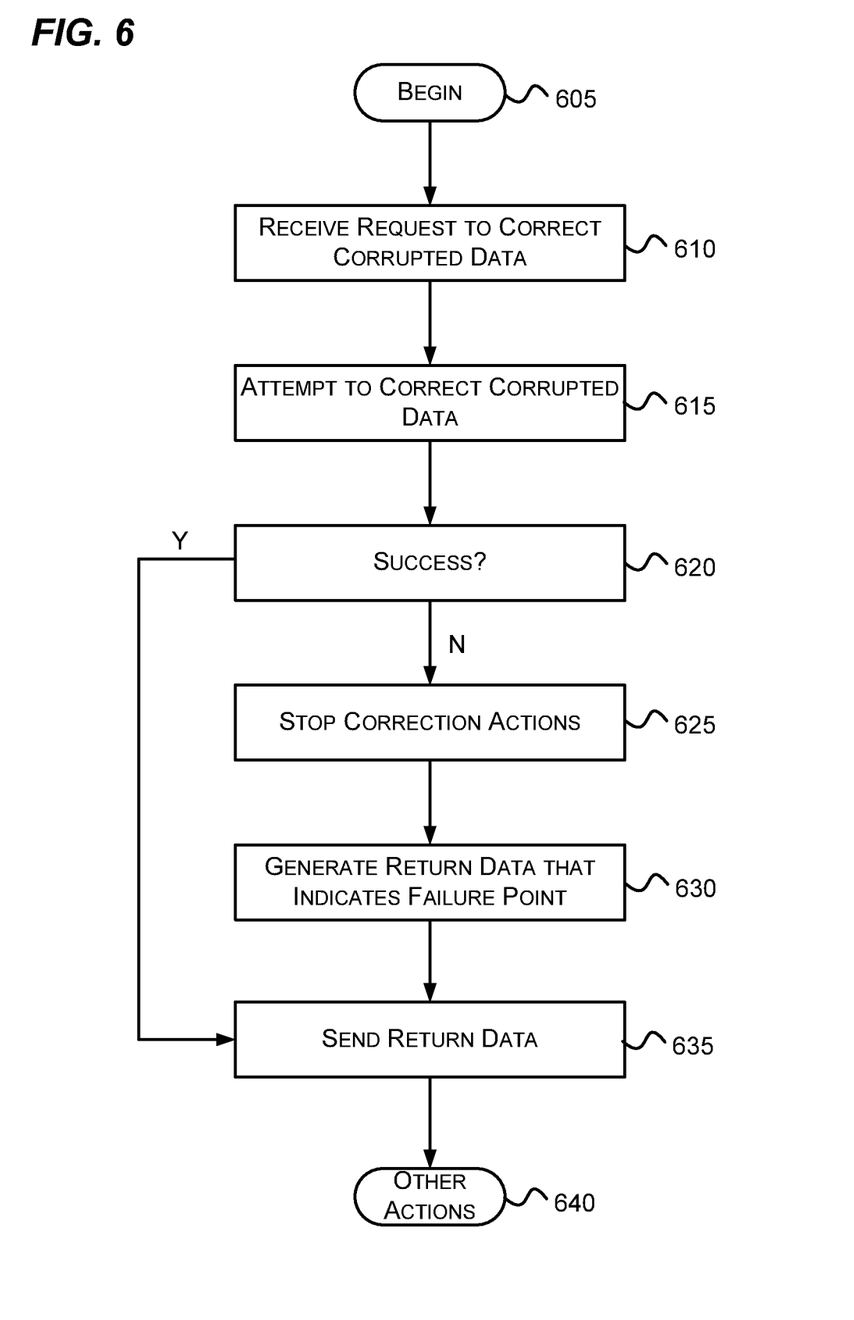
FIG. 6 is a block diagram that generally represents exemplary actions that may occur from the perspective of a storage system in accordance with aspects of the subject matter described herein.

FIG. 6 is a block diagram that generally represents exemplary actions that may occur from the perspective of a storage system in accordance with aspects of the subject matter described herein. At block 605, the actions begin.

At block 610, a request is received from a requestor. The request is a request to correct corrupted data from a redundant non-corrupted copy of the data. The request indicates (e.g., identifies) the non-corrupted copy of the data. The corrupted data may include one or more copies of the data. The one or more copies of the data are also indicated by the request. The requestor determines that the corrupted data is corrupted using a checksum maintained by the requestor. The checksum is additional to any checksum, if any, maintained by a storage system hosting storage devices that store the data and its redundant copies.

For example, referring to FIG. 2, the redundancy manager 208 may receive a request to correct a corrupted data on the stores 212 and 213 from non-corrupted data located on the store 215. This request may be sent from the application 205 or the scrubber 206.

At block 615, an attempt is made to correct the corrupted data using the redundant non-corrupted copy of the data. For example, referring to FIG. 6, the data from the store 215 may be used to attempt to correct the corrupted data on the stores 212 and 213 by, for example, copying data from the non-corrupted data over each of the corrupted copies of the data. In another example, other correction may occur such as overwriting only those portions of the corrupted data that are corrupted. In yet another example, to attempt to correct corrupted data, one or more write operations may be issued to overwrite all copies of the data. In this example, even copies that may have non-corrupted data may be overwritten.

At block 620, if the correction was successful, the actions continue at block 635 where data that indicates that the correction was successful is sent to the requestor. If, however, the correction failed, the actions continue at block 625.

At block 625, any subsequent correction actions are stopped if any portion of attempting to correct the corrupted data files fails. For example, referring to FIG. 2, if the redundancy manager 208 is not able to correct data of the storage 212, the redundancy manager 208 may stop any additional correction action corresponding to the request. In other words, in one embodiment, if the attempt fails at a point in attempting to correct the data, the redundancy manager 208 may not try to correct any more of the corrupted data. In another embodiment, the redundancy manager 208 may proceed past the point and attempt to correct other portions of the corrupted data before sending a return code to the application.

At block 630, return data is generated that indicates that attempting to correct the corrupted data failed and that indicates the failure point. For example, referring to FIG. 2, if the redundancy manager 208 was able to correct the first 4K of a corrupted file before it ran into a failure, the redundancy manger 208 may generate data that indicates this.

At block 635, the return data is sent to the requestor. For example, referring to FIG. 2, the redundancy manager 208 may send the return data to the file system 207 which may send it to the requestor (e.g., the application 205 or the scrubber 206).

At block 640, other actions, if any, may be performed.

In the case of some RAID-based storage systems, additional and/or other actions may occur to correct data. For example, in RAID 5 and some other RAID systems, the blocks may be striped across multiple disks. If a single block on one of the disks fails, it can be re-created using the blocks on the other disks together with the parity. If two or more copies of blocks in a stripe are corrupt, however, repairing one copy and re-computing the parity may "harden" an error by making it irreversible.

Figure 7:
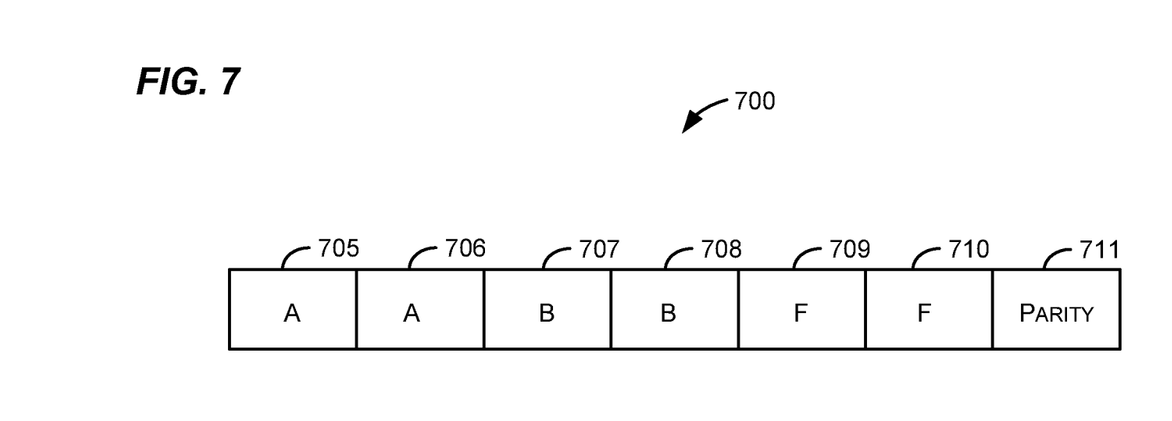
FIG. 7 is a block diagram that generally represents striping of data across disks in a RAID-based storage system in accordance with aspects of the subject matter described herein.

FIG. 7 is a block diagram that generally represents striping of data across disks in a RAID-based storage system in accordance with aspects of the subject matter described herein. As illustrated, the storage system includes 6 data blocks 705-710 and a parity block 711 although in other implementations there may be more or fewer data blocks and/or more parity blocks. Blocks 705 and 706 include data for an application A; blocks 707 and 708 include data for an application B, and blocks 709 and 710 include data for an application F.

If an application or scrubber detects corrupted data in a read of a block, an exemplary sequence for repairing this data is as follows:

1. Cause a validity check to be performed on all original data blocks that are part of the same stripe (e.g., blocks 705-710). An "original" data block is a data block that physically exists on the disk that can be obtained without employing the parity block;

2. Repair each corrupt original data block using the parity bit and other non-corrupted blocks of the stripe if possible;

3. Regenerate the parity block for the stripe from the repaired blocks if needed.

As an example, if an error was detected on block 708, blocks 705-707 and 709-710 would be checked for errors. If these blocks were non-corrupted, they may be used with the parity block 711 to correct block 708. If any of those blocks were corrupted, they would need to be corrected before block 708 could be corrected. If the blocks could not be corrected, an error may be generated by the application/scrubber indicating a bad stripe.

In addition, if the application/scrubber keeps a checksum on the parity block and/or there are two parity blocks, in cases where the parity block is needed to recreate a corrupt original block, a check may be performed to determine the validity of the parity blocks and the parity blocks may be corrected like the other blocks.

The principles and teachings above may also be applied to a component that resides in the file system. For example, in one embodiment, referring to FIG. 8, the file system 207 may have the functionality of the application 205 or the scrubber 206. In this embodiment, with a read request, the file system 207 may use the checksum data 209 to validate the data returned from the storage 212-214 and may correct that data returned as needed using the same techniques that have been described previously. This may be done with or without an originating requestor of the read request knowing that the data was corrected prior to being returned.

Likewise, in one embodiment, a component of the file system 207 may have the functionality of the scrubber 206. In both of the embodiments above, the file system 207 may also maintain the checksum data 209 as the only file system checksum data for the storage or in addition to any other checksum data maintained by the file system 207. Furthermore, in these embodiments, the file system 207 may originate (i.e., be the source of) requests to correct corrupted data.

As can be seen from the foregoing detailed description, aspects have been described related to repairing data of a storage system. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method performed on a computing device that includes an application, the method comprising:

receiving, by the application via an application programming interface ("API") of a storage system, data from a store of the storage system, where one or more redundant copies of the data are obtainable from the storage system, where the application is separate from the storage system and from an operating system of the computing device;

obtaining, by the application, a checksum corresponding to the received data, the checksum being additional to any storage checksum maintained by the storage system;

determining, by the application based on the checksum, that the data is corrupted;

obtaining, by the application via the API, a copy of the one or more redundant copies of the data;

verifying, by the application based on the checksum, that the obtained copy contains non-corrupted data; and correcting, based on the verified copy, the corrupted data.

2. The method of claim 1 where the correcting comprises replacing the corrupted data with the verified copy.

3. The method of claim 1 where the correcting comprises instructing, by the application, the storage system to replace the corrupted data with the verified copy.

4. The method of claim 1 where the storage system is a file system.

5. The method of claim 1 where the API is configured for allowing the application to query the storage system for a count of the one or more redundant copies of the data.

6. The method of claim 1 further comprising indicating, by the application via the API, a specific copy of the data from among the one or more redundant copies to be used by the storage system for subsequent operations associated with the data.

7. The method of claim 1 where the data is comprised in a file.

8. A system comprising a computing device, a memory, and an application together configured for performing actions comprising:

receiving, by the application via an application programming interface ("API") of a storage system, data from a store of the storage system, where one or more redundant copies of the data are obtainable from the storage system, where the application is separate from the storage system and from an operating system of the computing device;

obtaining, by the application, a checksum corresponding to the received data, the checksum being additional to any storage checksum maintained by the storage system;

determining, by the application based on the checksum, that the data is corrupted;

obtaining, by the application via the API, a copy of the one or more redundant copies of the data;

verifying, by the application based on the checksum, that the obtained copy contains non-corrupted data; and correcting, based on the verified copy, the corrupted data.

9. The system of claim 8 where the correcting comprises replacing the corrupted data with the verified copy.

10. The system of claim 8 where the correcting comprises instructing, by the application, the storage system to replace the corrupted data with the verified copy.

11. The system of claim 8 where the storage system is a file system, or where the data is comprised in a file.

12. The system of claim 8 where the API is configured for allowing the application to query the storage system for a count of the one or more redundant copies of the data.

13. The system of claim 8, the actions further comprising indicating, by the application via the API, a specific copy of the data from among the one or more redundant copies to be used by the storage system for subsequent operations associated with the data.

14. A computer memory device storing computer-executable instructions that, when executed by a computing device that includes an application, cause the computing device to perform actions comprising:

receiving, by the application via an application programming interface ("API") of a storage system, data from a store of the storage system, where one or more redundant copies of the data are obtainable from the storage system, where the application is separate from the storage system and from an operating system of the computing device;

obtaining, by the application, a checksum corresponding to the received data, the checksum being additional to any storage checksum maintained by the storage system;

determining, by the application based on the checksum, that the data is corrupted;

obtaining, by the application via the API, a copy of the one or more redundant copies of the data;

verifying, by the application based on the checksum, that the obtained copy contains non-corrupted data; and correcting, based on the verified copy, the corrupted data.

15. The computer memory device of claim 14 where the correcting comprises replacing the corrupted data with the verified copy.

16. The computer memory device of claim 14 where the correcting comprises instructing, by the application, the storage system to replace the corrupted data with the verified copy.

17. The computer memory device of claim 14 where the storage system is a file system.

18. The computer memory device of claim 14 where the API is configured for allowing the application to query the storage system for a count of the one or more redundant copies of the data.

19. The computer memory device of claim 14, the actions further comprising indicating, by the application via the API, a specific copy of the data from among the one or more redundant copies to be used by the storage system for subsequent operations associated with the data.

20. The computer memory device of claim 14 where the data is comprised in a file.

\* \* \* \* \*